United States Patent [19]

Shoemaker

[11] Patent Number: 4,783,630

[45] Date of Patent: Nov. 8, 1988

[54] METAL DETECTOR WITH CIRCUITS FOR AUTOMATICALLY SCREENING OUT THE EFFECTS OF OFFSET AND MINERALIZED GROUND

[75] Inventor: Donald K. Shoemaker, Sweet Home, Oreg.

[73] Assignee: White's Electronics, Inc., Sweet Home, Oreg.

[21] Appl. No.: 844,797

[22] Filed: Mar. 27, 1986

[51] Int. Cl.[4] .................. G01V 3/11; G01R 33/00
[52] U.S. Cl. ..................................... 324/329; 324/233
[58] Field of Search .............................. 324/326–329, 324/233

[56] References Cited

U.S. PATENT DOCUMENTS 4,303,897  12/1981  Podhrasky ........................... 324/324
4,387,338  6/1983  Hecht et al. ........................ 324/236
4,470,015  9/1984  Hirschi et al. ..................... 324/233

Primary Examiner—Reinhard J. Eisenzopf
Assistant Examiner—Walter E. Snow
Attorney, Agent, or Firm—Chernoff, Vilhauer, McClung & Stenzel

[57] ABSTRACT

A portable transmit/receive induction balance type metal detector having an automatic ground exclusion balance (GEB) feature to facilitate the screening out of the effects of mineralized ground. The circuitry provides a static GEB in a single try and then, if selected by the user, continual automatic GEB on a dynamic basis as the system is used. The circuit includes a pair of quadrature phase detectors, one of whose outputs is approximately in phase with the ground component of the loop return signal. That output is modified, during an air balance of the detector, to remove the residual offsets in the circuit. This modified output in turn is summed with the other phase detector output to produce a phase detection signal that can be adjusted by automatic means to be precisely in quadrature with the ground component of the loop return signal. A controller is provided, with selectable user inputs, to initiate the static and dynamic GEB operations. An error amplifier in conjunction with two sample/hold elements and a variable duty cycle chopper operate in a feedback loop to appropriately adjust the phase detection signal. Audible beep indications are generated to signal the user when the steps in the automatic GEB are completed.

6 Claims, 15 Drawing Sheets

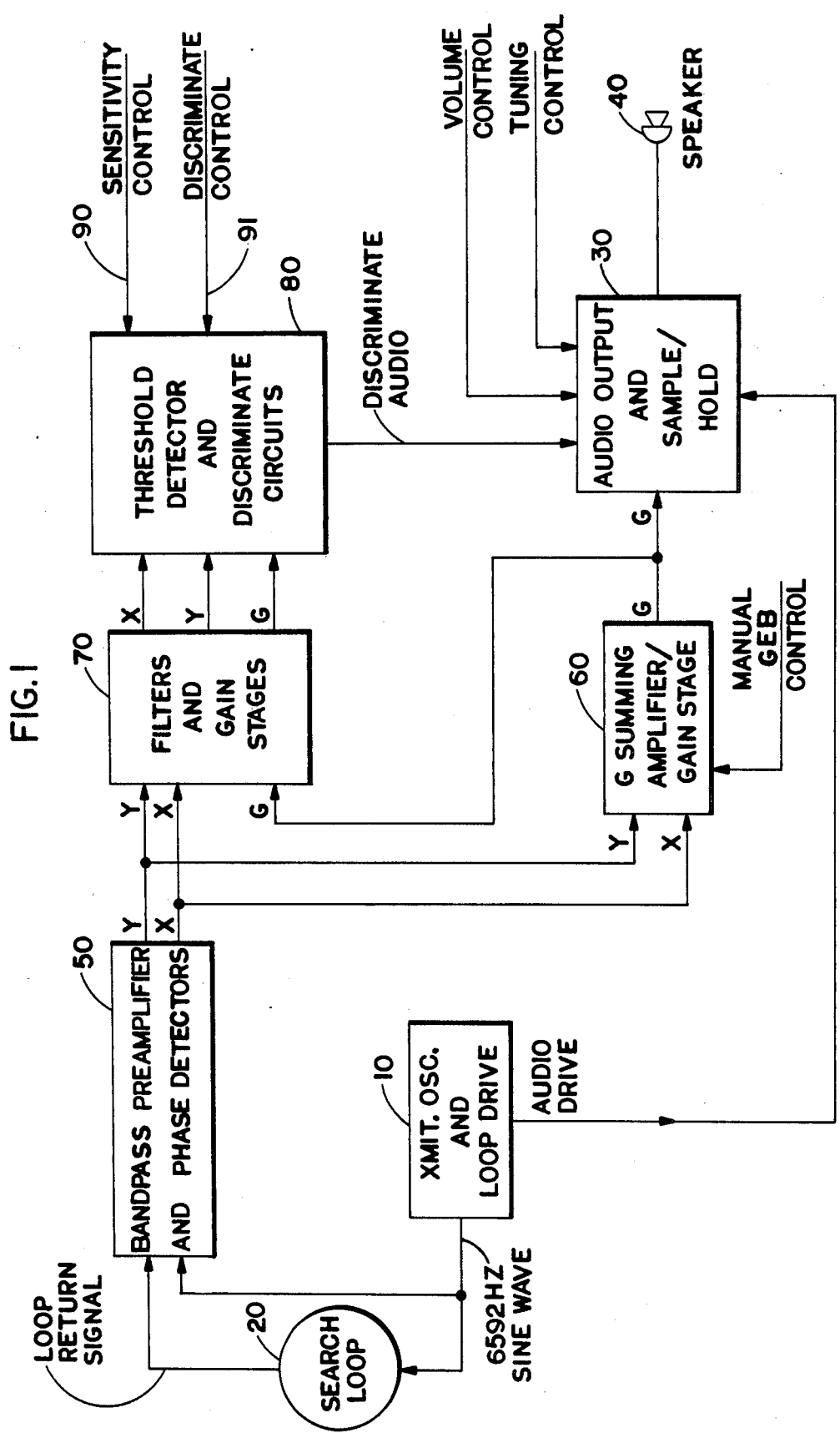

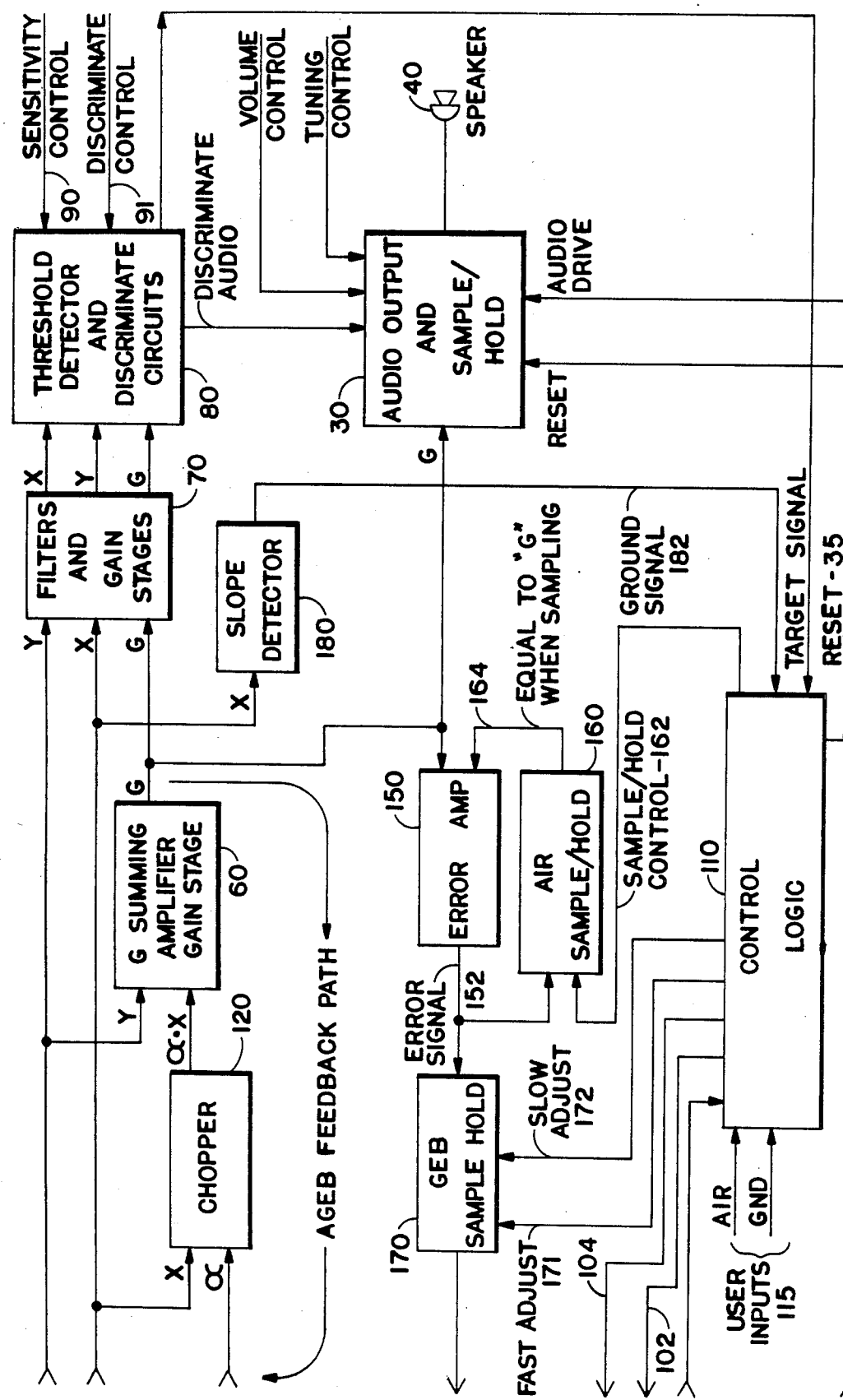

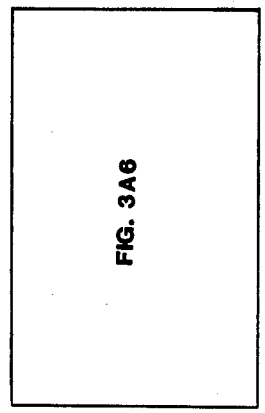
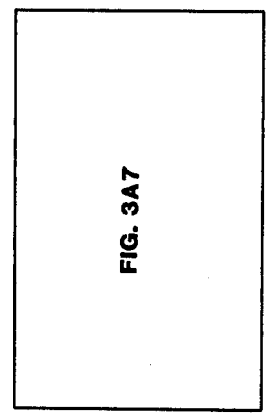
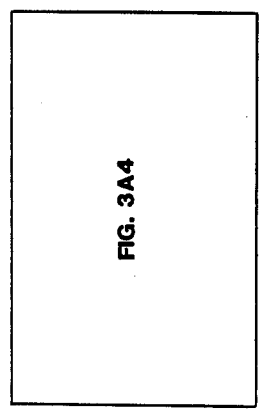
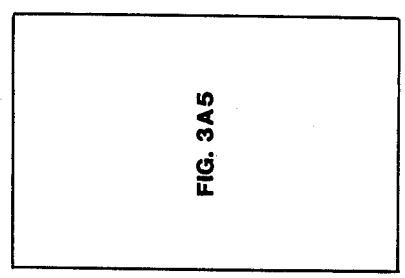
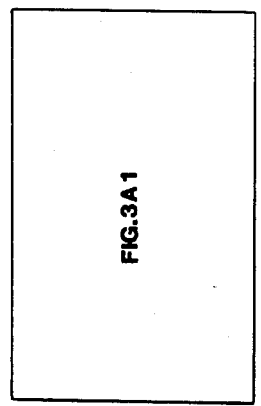
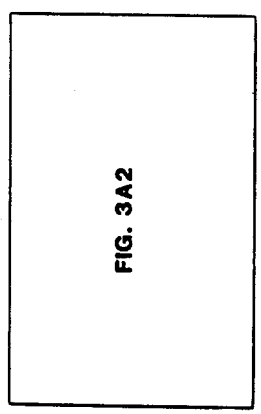
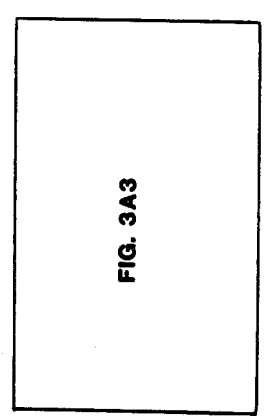
FIG. 3A0

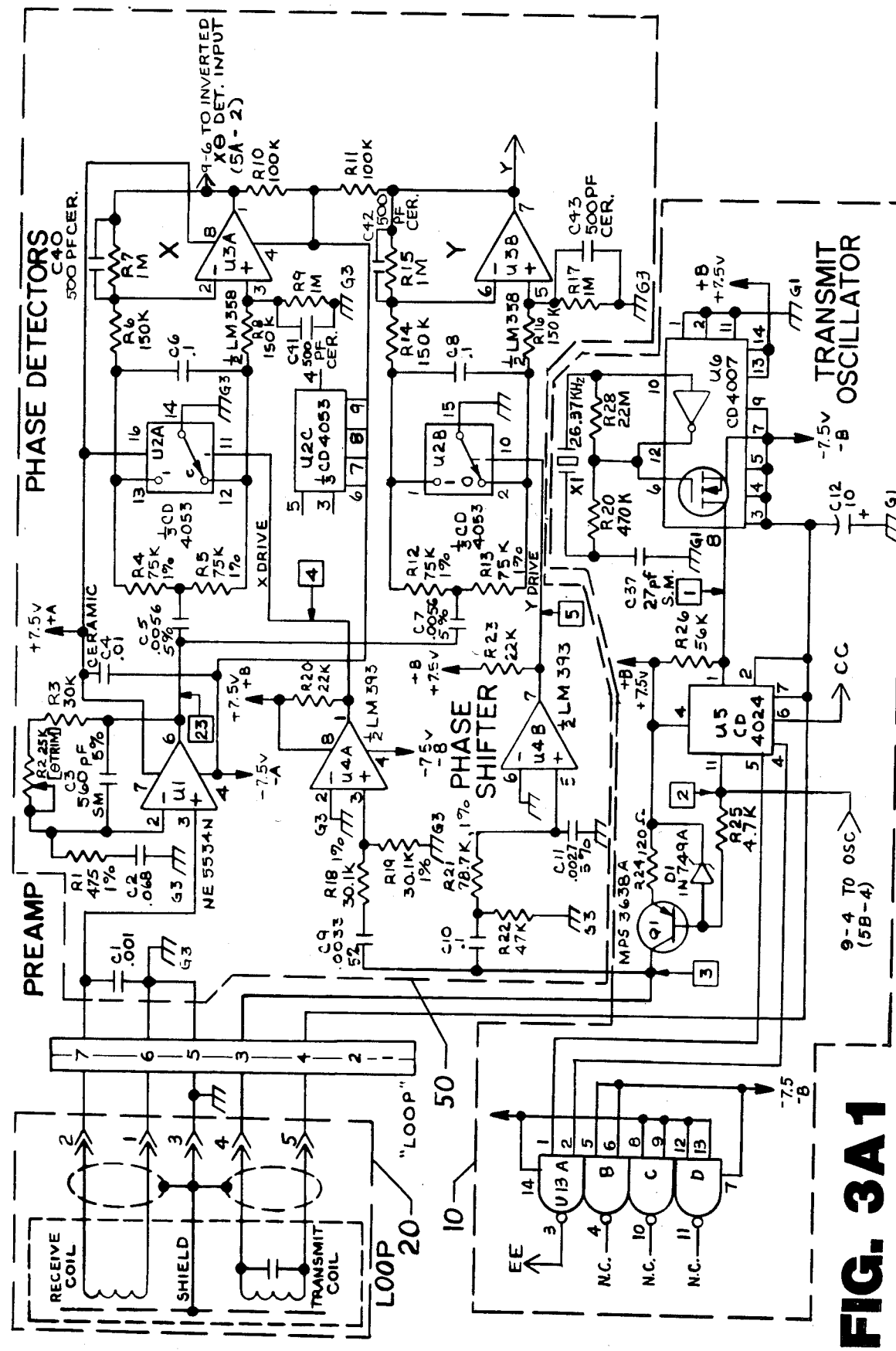
FIG. 3A1

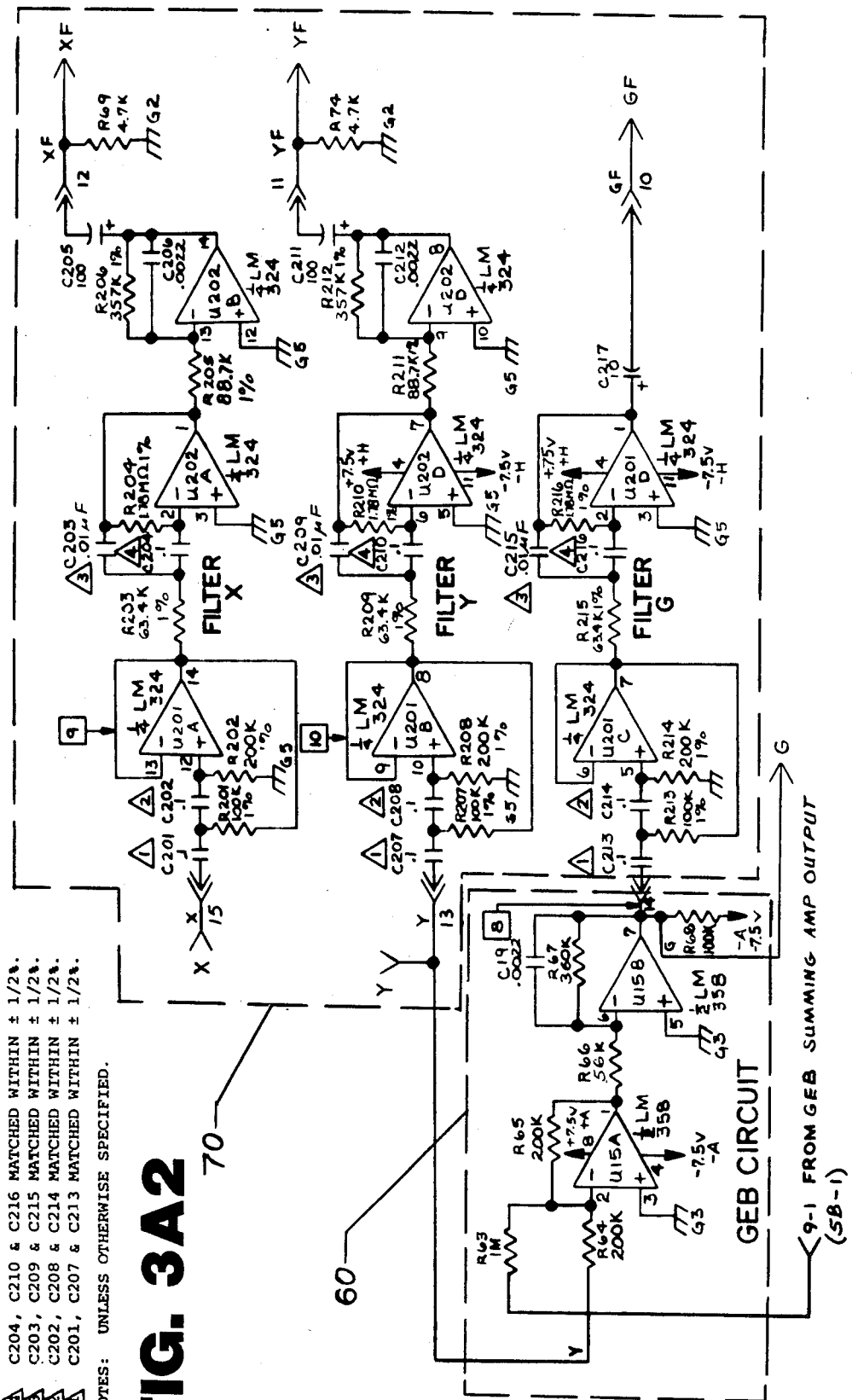
FIG. 3A2

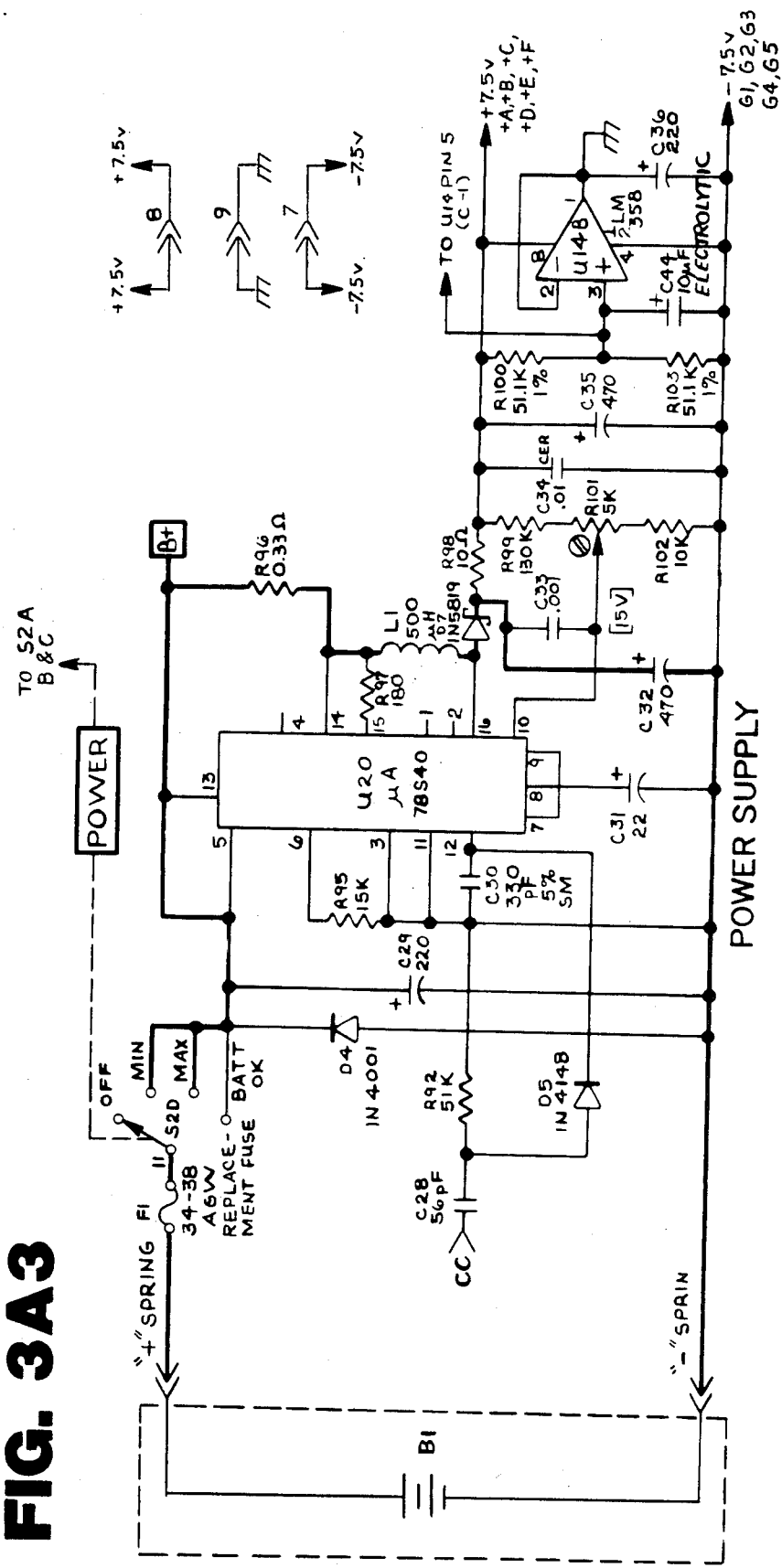
FIG. 3A3

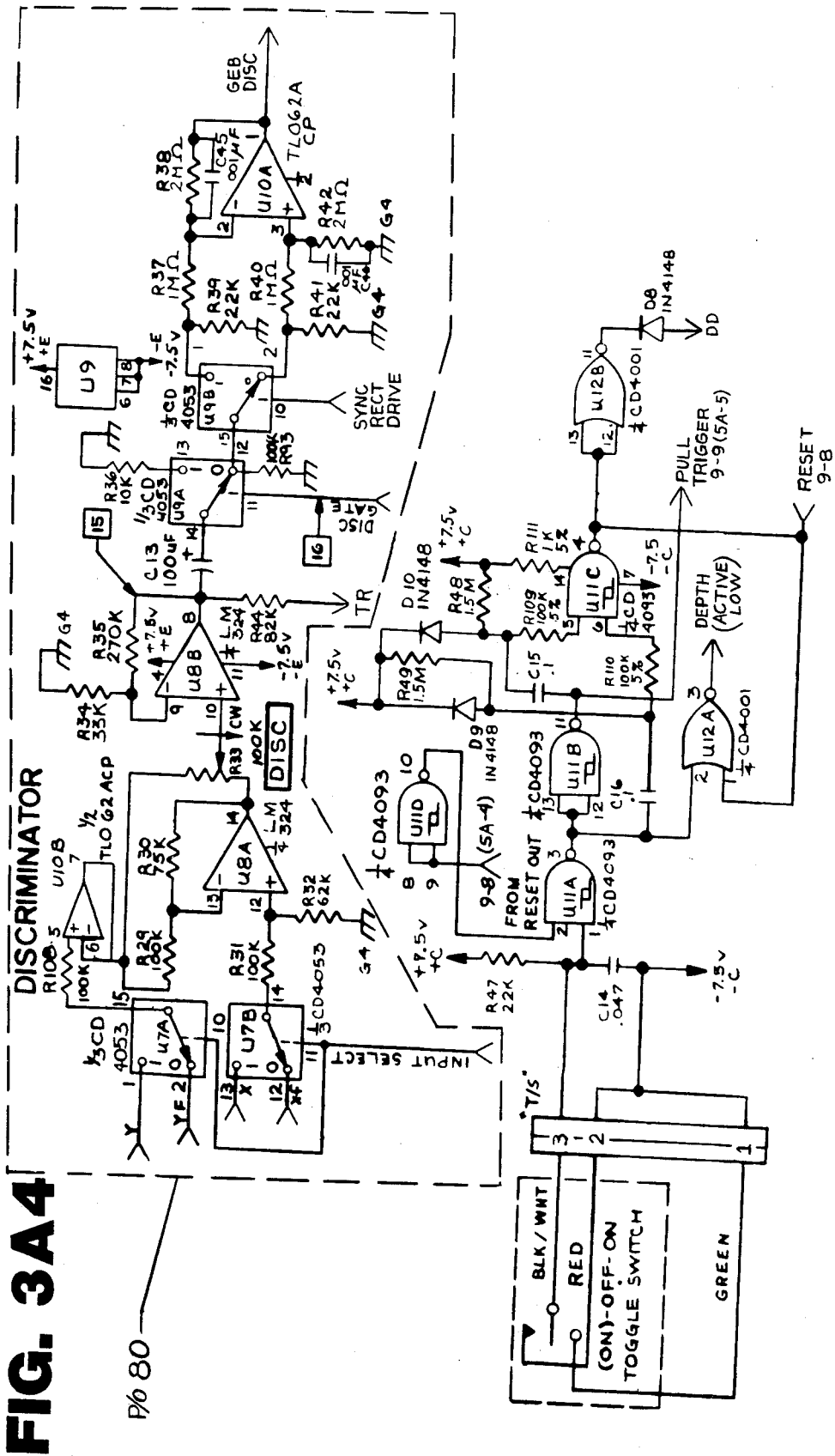
FIG. 3A4

FIG. 3A5
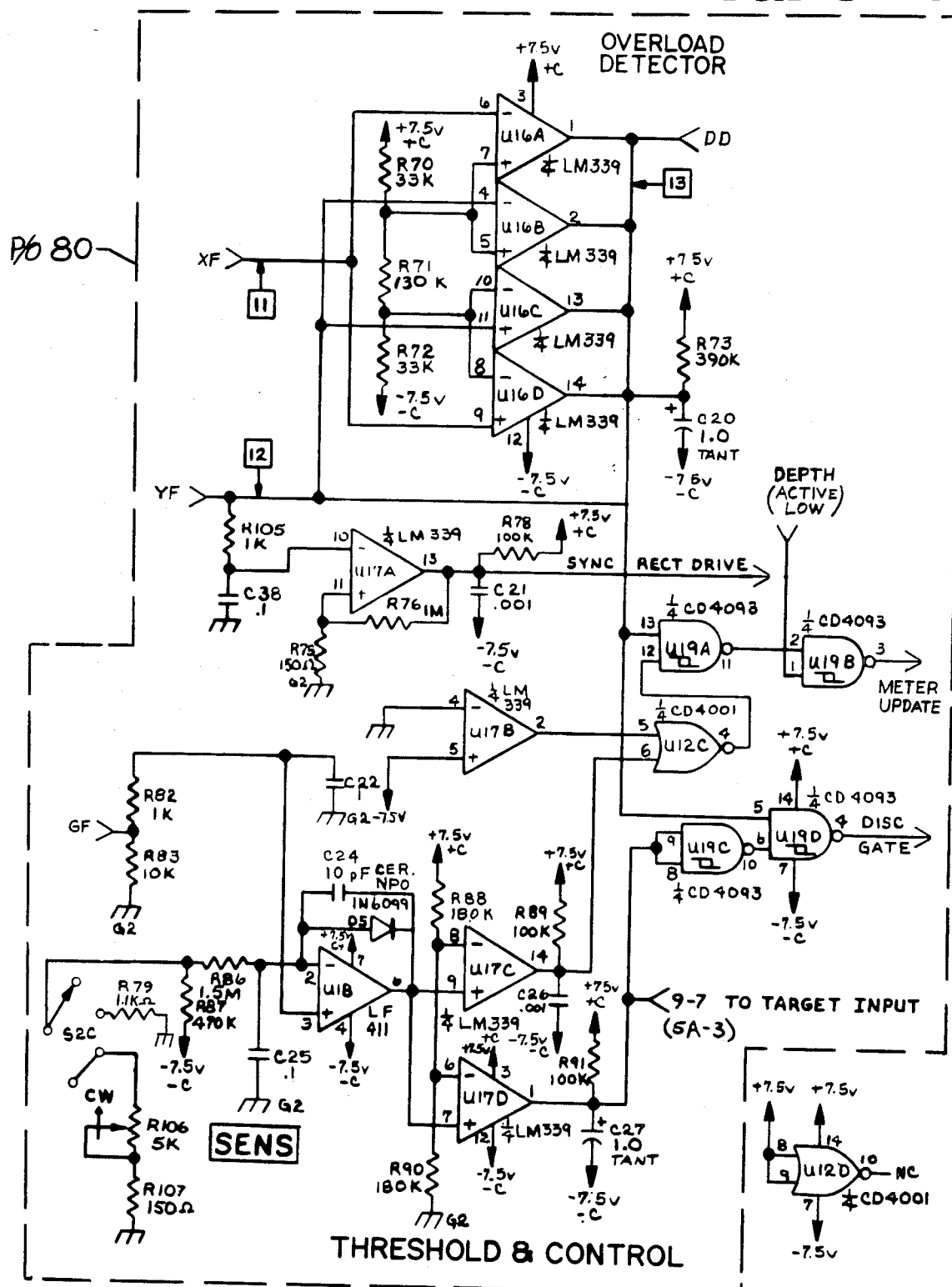

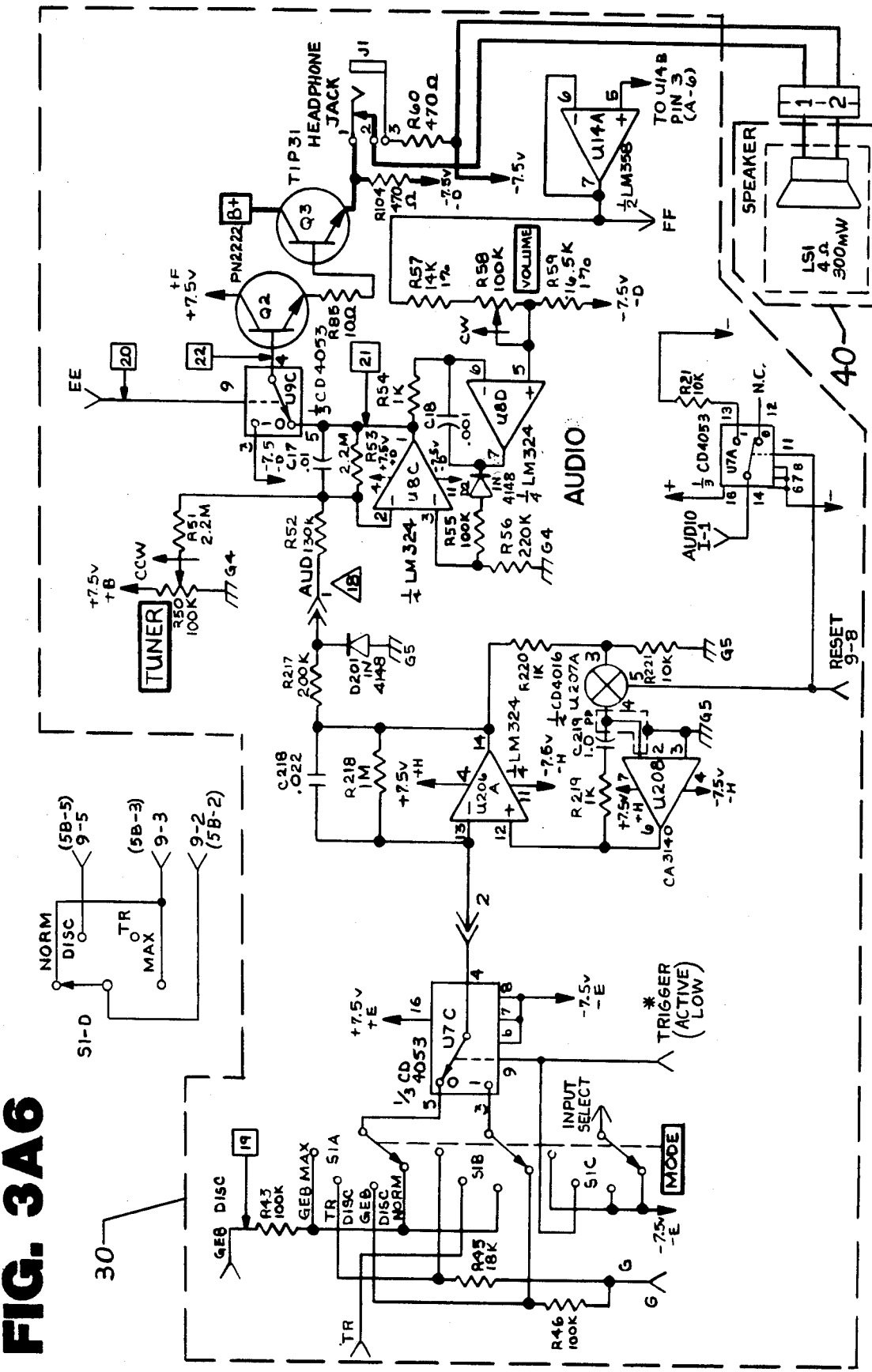
FIG. 3A6

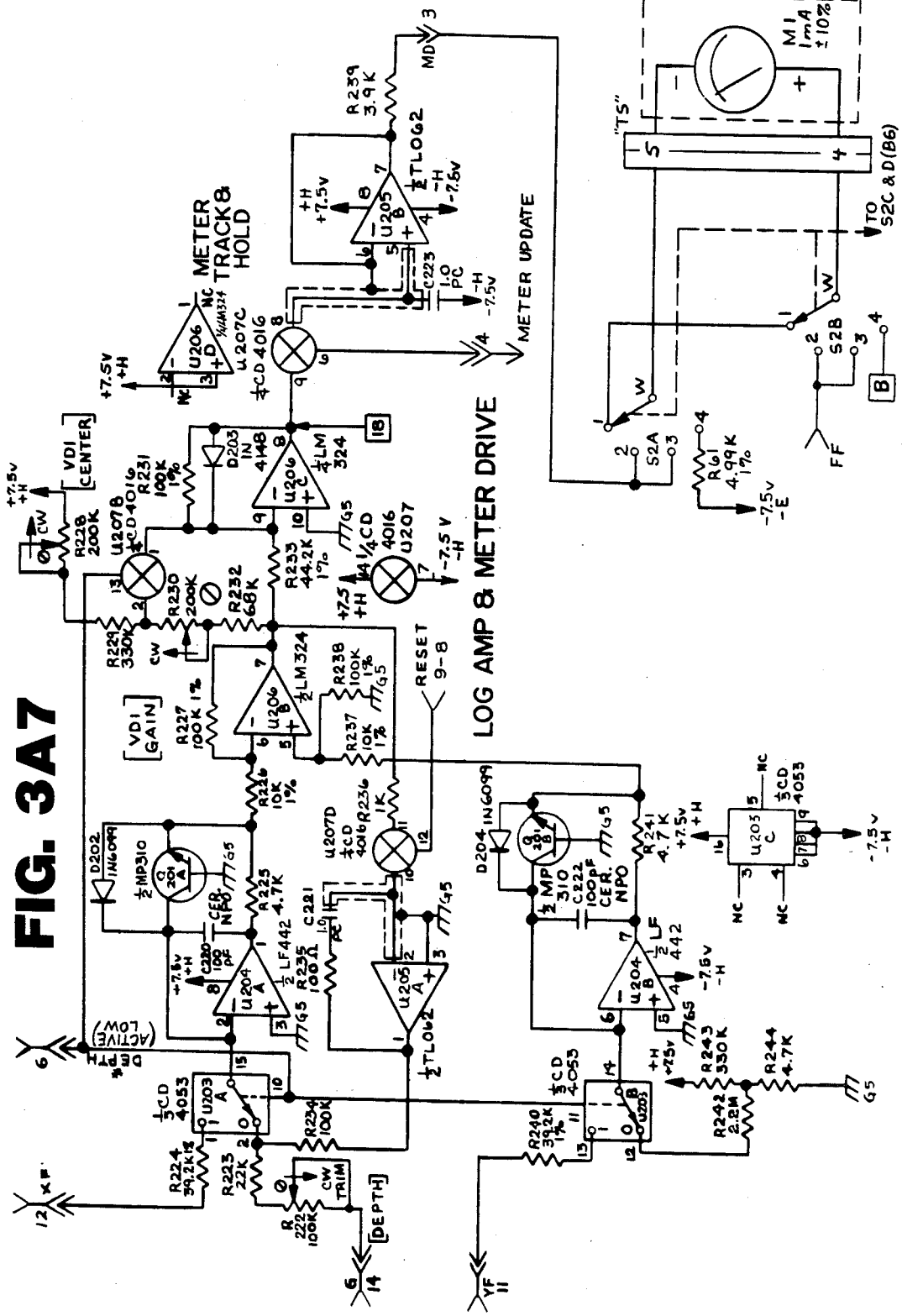
FIG. 3A7

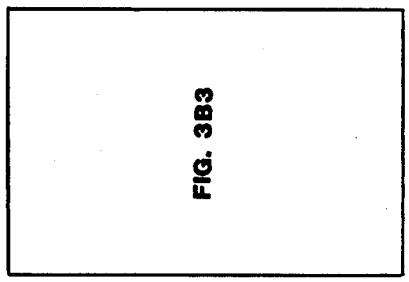
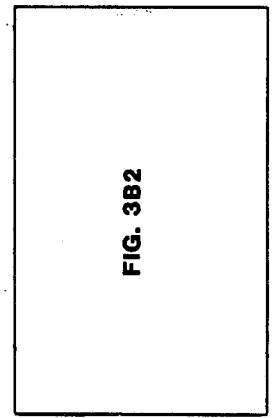
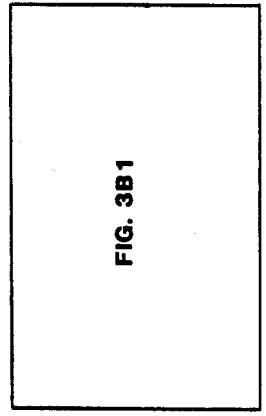
FIG. 3B0

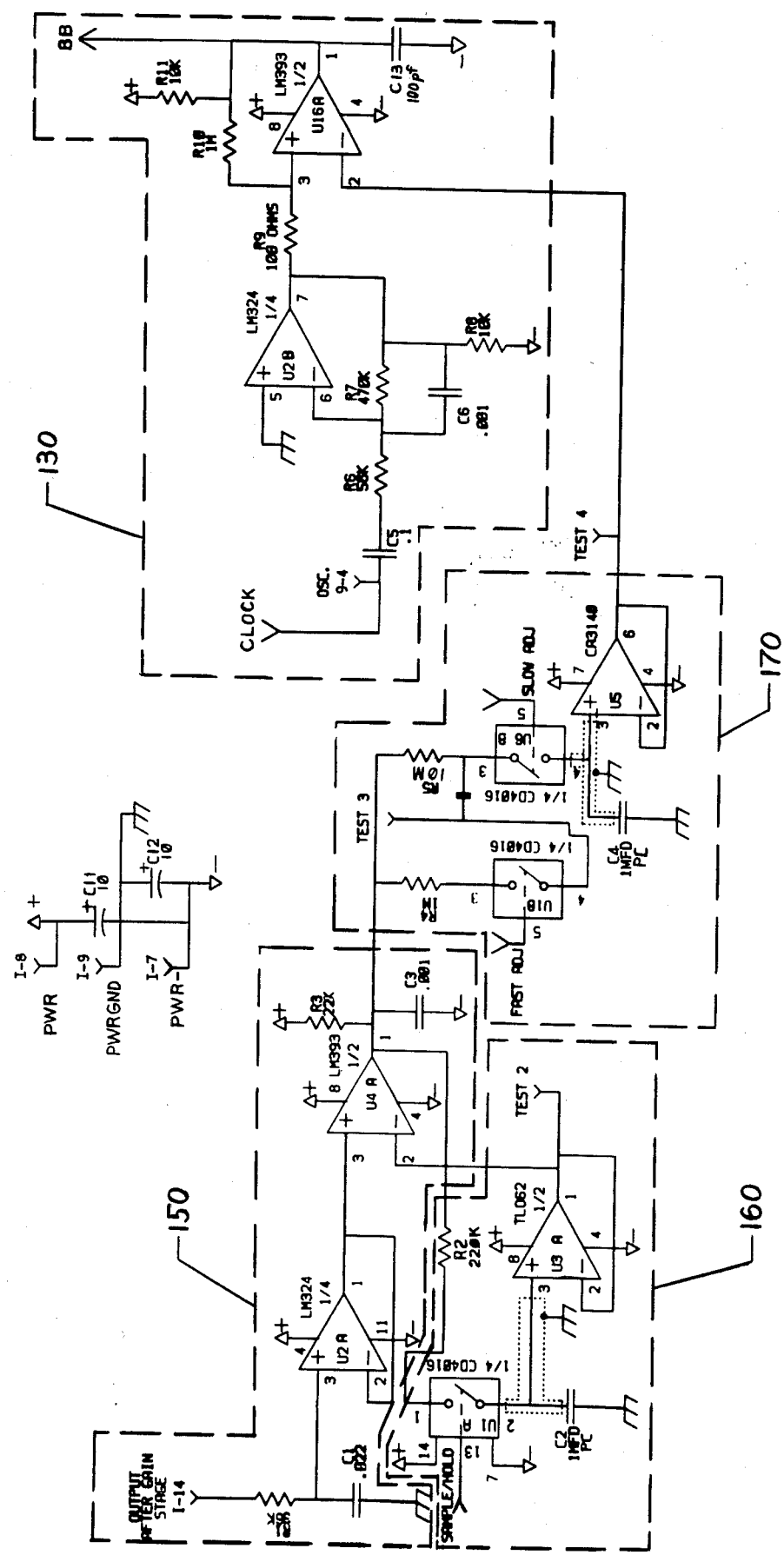
FIG. 3B1

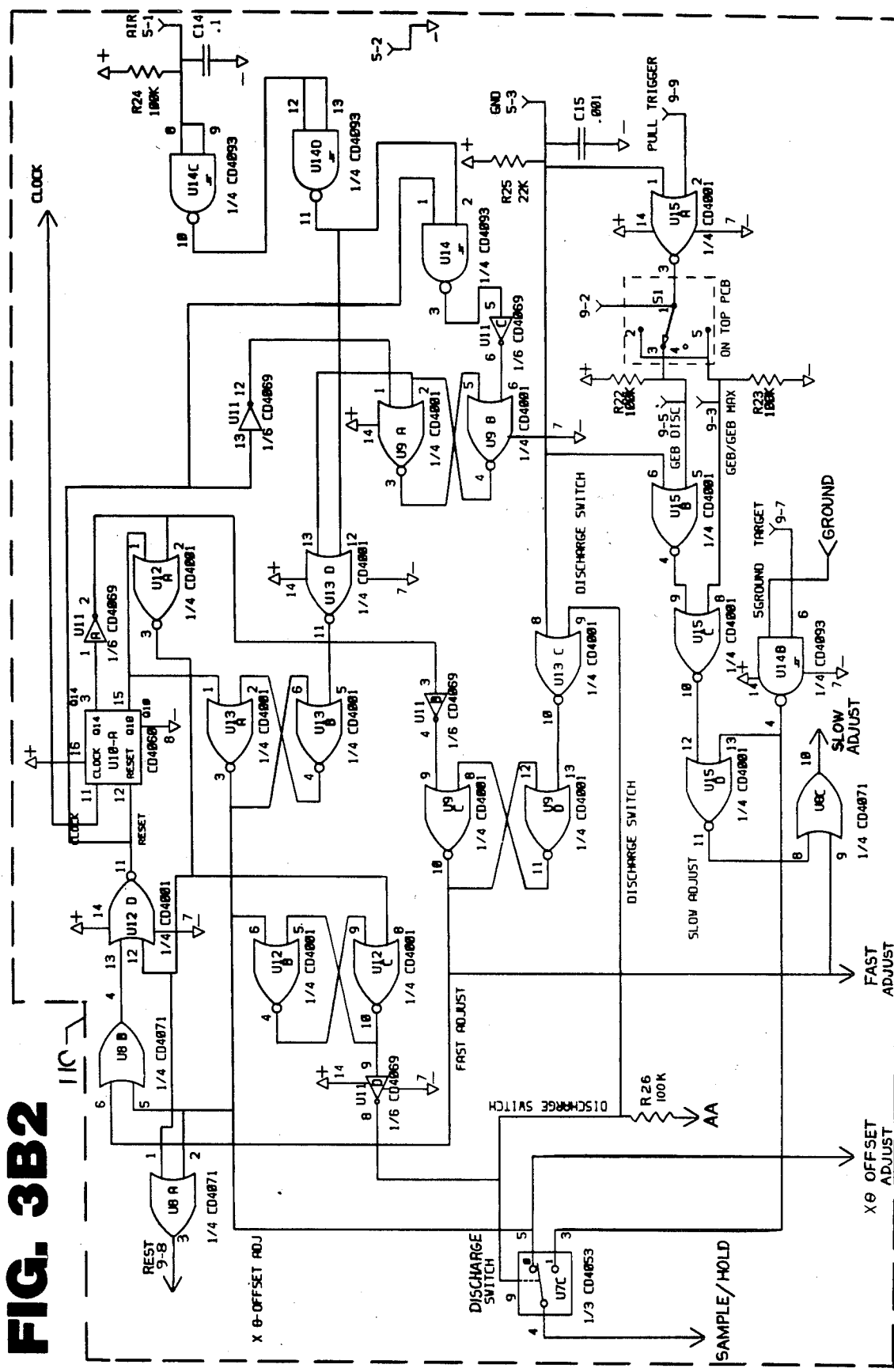

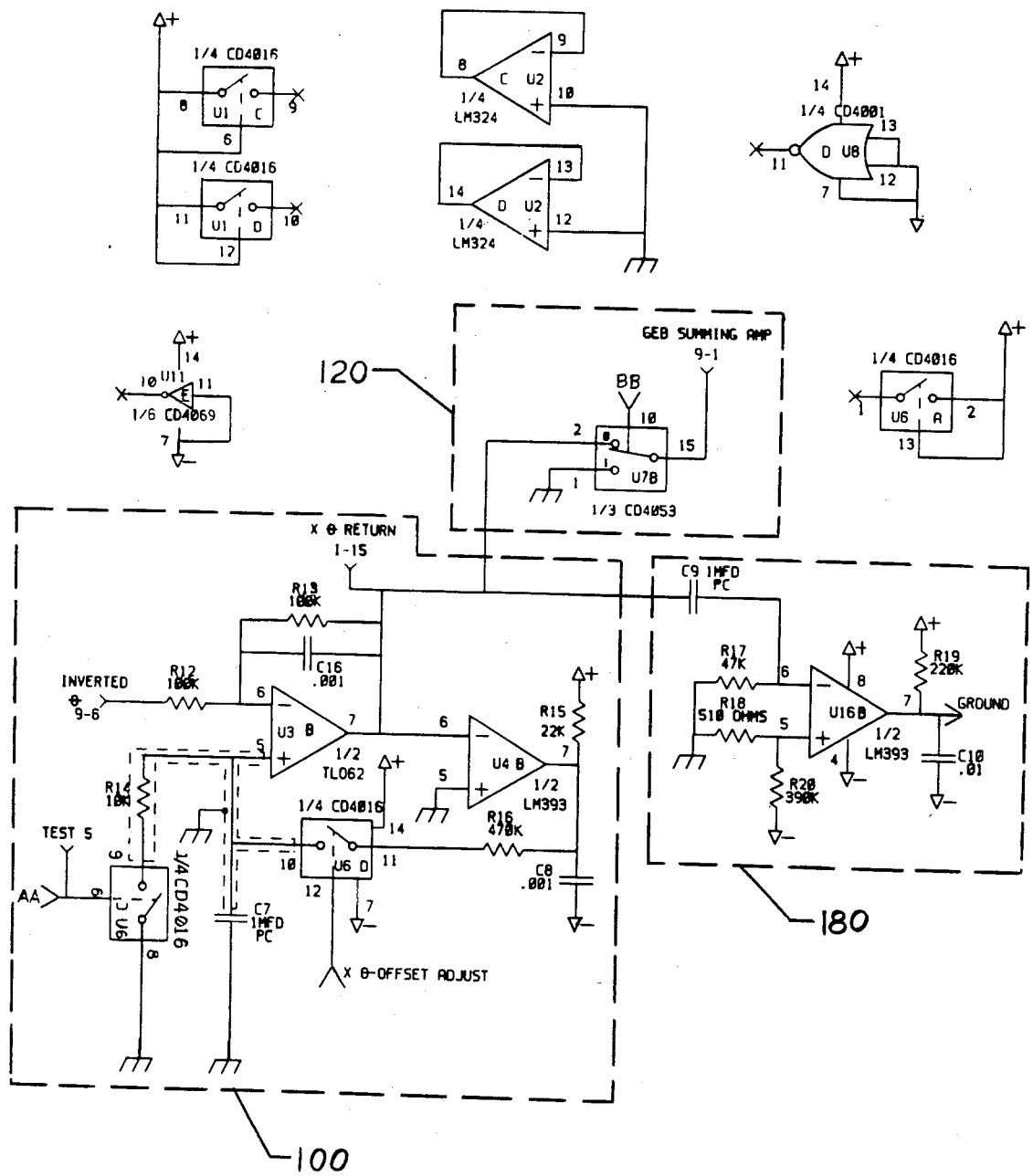
FIG. 3B3

METAL DETECTOR WITH CIRCUITS FOR AUTOMATICALLY SCREENING OUT THE EFFECTS OF OFFSET AND MINERALIZED GROUND

BACKGROUND OF THE INVENTION

The present invention relates to an apparatus and method for providing automated ground exclusion balance in portable hand-held metal detectors of the induction balance transmit/receive type in popular use today for searching and finding metal objects lying on or buried just beneath the surface of the ground. Such detectors are held by the operator and moved or swept over the surface of the ground, and, when the detector passes over a metal object, the disturbance of a magnetic field created in the area of the detector's search loop, as generated by a transmit coil signal and monitored by a receive coil, unbalances the coil loop circuit and causes the detector to produce a visual or audible indication of the presence of the metal object. Such instruments have in recent years become quite sophisticated in operation, sufficiently so that, by responding not only to the amplitude of the magnetic field disturbance but also to the shift in the phase angle of the received or target signal relative to the transmitted signal, an approximate indication can be provided by the detector as to the type of metal object located, e.g. coins as opposed to aluminum pull-tabs, and even as to the type of metal coin involved, penny, nickel, dime, quarter, etc. However, before utilizing these detectors to search for and locate metal objects it is first necessary to adjust the loop circuit to screen out the effects of the mineralized ground in the area. The compensation or adjustments to the detector's search head loop circuit for such earth effects, referred to herein as "ground exclusion balance" or, more simply, "GEB," was commonly carried out prior to the present invention by cut-and-try manual techniques in which the operator would first reset the detector instrument in air to cancel all offsets and to set a low but discernible audio tone level in the detector, and then hold it on or just above a patch of ground known or believed to be free of metal objects. The change from air to ground typically would cause either a marked decrease or increase in the audio tone, and the operator would next respond by changing, through manipulation of a knob setting on the instrument, the parameters of its detector circuitry to change the tone level in the opposite direction. The operator would then repeat the reset step, again change the ground balance setting, and continue this sequence as many times as necessary until the change in tone level in going from air to ground, or back, was either eliminated or reduced to an acceptable minimum level. Such manual GEB adjustment, as can readily be appreciated from the foregoing description, was tedious and time-consuming, and the procedure had to be repeated whenever the mineralization content of the ground changed appreciably as the operator worked over an area.

SUMMARY OF THE INVENTION

The present invention provides a control logic circuit means for automating this GEB operation, both staticly and dynamically, the latter referring to the GEB function being performed by the instrument on a continual, automatic basis as the detector is used to search over an area. As a consequence the operator, using a metal detector with this feature, can quickly set the instrument for search and find activity, with the offset or adjustment in the loop circuit required to screen out the ground mineralization effects provided automatically, and then have this screening in effect, without further ado, as he/she proceeds over an area even though the ground's mineralization content might change dramatically.

In an exemplary embodiment of the present invention an air balancing operation is performed by the instrument's circuit, in response to operator switch actuation, while momentarily holding the unit with its search head up in the air and away from any metal objects. An audible beep tone signals the completion of this "air balance" cycle. The operator then places the loop on or very near the ground and switches the instrument to the "ground balance" cycle. The instrument's control logic circuit then proceeds to automatically make the necessary changes in the loop circuit parameters to accomplish ground effect elimination, and when this step is completed a second audible beep occurs, thus signaling that the instrument is ready for use. The user can then, if desired, empirically confirm that the instrument is indeed ground balanced by listening for any change, in either direction, in the threshhold tone as the loop is moved over the ground in an area free of targets. After this static GEB has been accomplished the operator can, if desired, maintain the detector in ground balance automatically as he/she uses it. The instrument is provided with a self-adjusting, or dynamic, ground balancing feature which, as the loop is swept over the ground, a tracking circuit operates, under operator switch selection, to automatically incrementally adjust the loop's circuit parameters, as needed, to maintain the unit in ground balance even as the mineralization content of the soil changes. The instrument, in the illustrative embodiment herein described, is also provided with a sensitivity-adjustable knob setting to enable the user to regulate the operation of the tracking circuit so that target objects within the instrument's range will not inadvertently be tuned out. In a preferred form of the invention the detector is additionally provided with a user-selectable "preset" or factory fixed setting on its sensitivity control which enables a novice operator to obtain satisfactory performance with the unit with a minimum of fuss (however, an experienced user will invariably desire to set his/her own level of sensitivity in the instrument, particularly when searching unusual terrain.) Selection of the preset setting on sensitivity locks out the sensitivity knob control and prevents the user from turning the sensitivity control up so much that the ground balance tracking circuit does not work properly. Use of the preset setting enables the instrument to be used effectively after a short while, even without performing the GEB steps referred to previously, as sweeping of the detector back and forth over the ground in searching will cause the tracking circuit to eventually, in about 30 to 50 sweeps (the number required being determined by the amount the instrument is initially off-range from the GEB condition), bring the loop circuit into ground balance. In the tracking circuit provided in the automated GEB system of the present invention the adjustment in the detector circuit's parameters is made on each sweep of the search head as it approaches the low point nearest to the ground. Thus, for best results, the operator should implement the initial, or static, GEB with the loop resting on or very near the ground, and then search by sweeping the loop as close to the ground as possible. If condition of the ground changes as the operator moves about the area the tracking circuit will adjust the loop circuit to keep the instrument in ground balance at all times without need for operator intervention.

Other objectives, features and advantages of the invention will be apparent upon consideration of the following detailed description of the invention, taken in conjunction with the accompanying drawings.

BRIEF DESCRIPTION OF THE DRAWINGS

FIG. 1 is a block diagram of an illustrative example of a metal detector of the induction balance transmit/receive balance type, with no provision for an automatic ground exclusion balance feature.

FIGS. 2A and 2B block diagram of the metal detector embodiment of FIG. 1 modified to include an automatic ground exclusion balance feature in accordance with the present invention.

FIGS. 3A0-3A7 and 3B0-3B3 are electrical schematic diagrams of an exemplary circuit embodiment of the metal detector of FIG. 2 having the automatic ground exclusion balance feature of the present invention.

FIGS. 3A0 and 3B0 are diagrams illustrating the layout arrangement of the electrical schematic diagrams of FIGS. 3A1 to 3A7 and 3B1 to 3B3 respectively.

DETAILED DESCRIPTION OF THE INVENTION

Figure 2A:
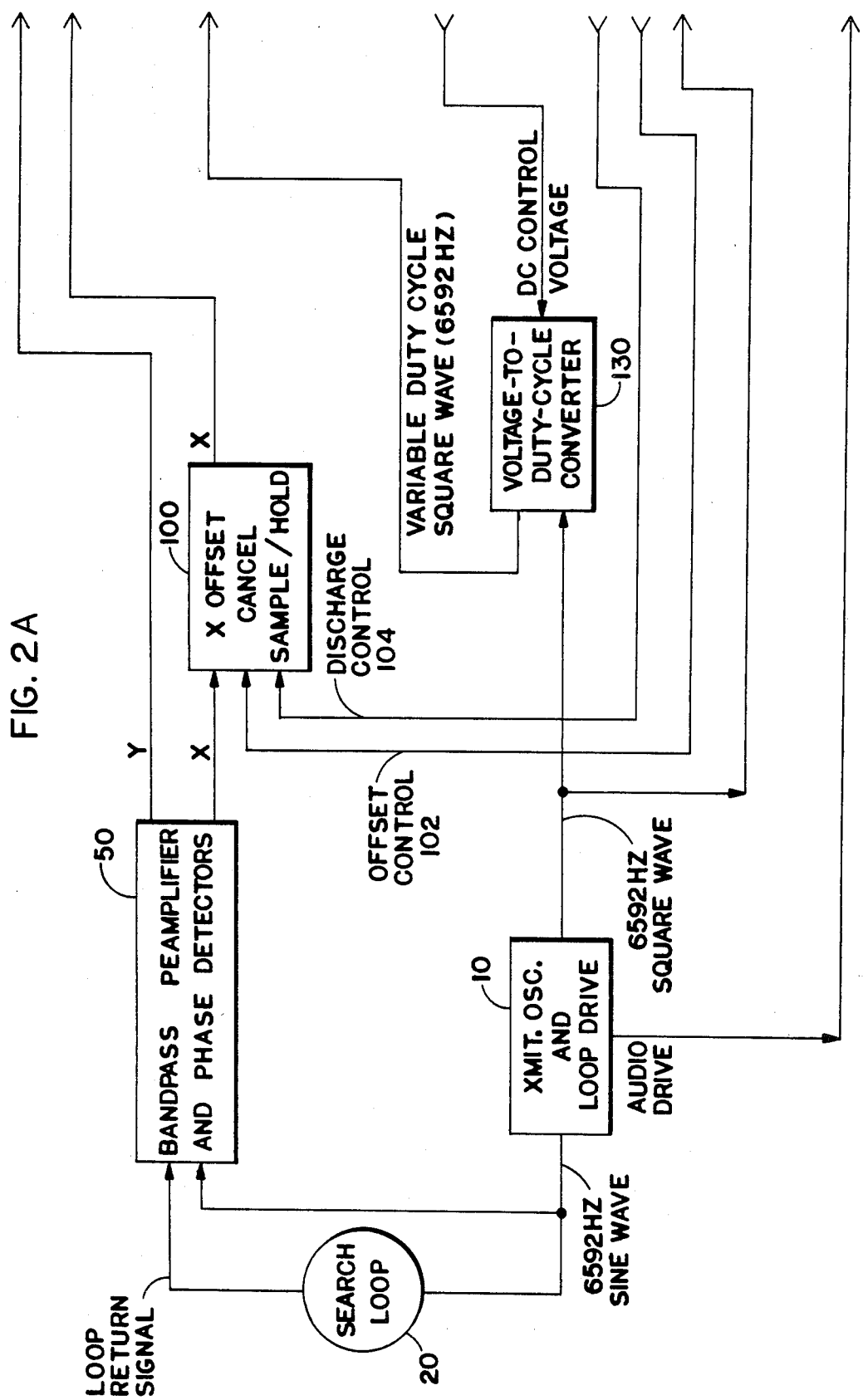

An illustrative embodiment of a metal detector of the described type having the automatic ground exclusion balance (AGEB) feature of the present invention is currently manufactured and marketed by applicant's assignee, White's Electronics, Inc., of Sweet Home, Oreg., under the model name and trademark COIN-MASTER 6000/Di Professional (hereinafter referred to as the "6000/Di Pro").

The operator's manual for the 6000/DiPro instrument, published by White's Electronics, Inc., describes the manner in which the AGEB feature is utilized by the operator through panel switch settings and manipulations of the instrument's search head. While such description has been summarized earlier herein and is non-essential to an understanding of the nature and manner of operation of the present invention, it is useful in understanding its background and operational environment. Accordingly, that publication, to the extent pertinent hereto in respect to the AGEB feature, is herein incorporated by this reference.

Referring first to FIG. 1, there is shown a simplified block diagram of a transmit/receive type induction balance metal detector, corresponding to the Model 6000/Di Pro, but without the AGEB feature included. The instrument comprises a Transmit Oscillator and Loop Drive 10 which causes a sinusoidal waveform to be produced in to the Search Loop 20 as well as providing an audio tone signal, supplied via Audio Output 30, to the Speaker 40 which provides an audible indication to the operator of the status of the loop's balance circuit. The Audio Output 30 is preferably provided with a user-actuatable Sample/Hold circuit--a conventional feature--to allow offsets in the input to the audio stage to be cancelled. The Search Loop 20, as is conventional, comprises a pair of coils—a transmit coil driven by the Transmit Oscillator which generates a magnetic field in the area of the search loop and a receive coil which is responsive to changes in that magnetic field caused by the nearby environment. Targets coming within the area of the transmit coil's field change the loop return signal produced in the receive coil's windings which are connected to a Band Pass Preamplifier and Phase Quadrature Detectors 50. The Band-Pass Preamplifier portion boosts and buffers the loop return signal and reduces the gain for frequencies far from the Transmit Oscillator's frequency. The Phase Detectors are substantially identical and serve as a balanced demodulator X and Y component quadrature phase detector system. The two respective outputs X and Y of the Phase Detectors are summed in GEB Summing Amplifier 60 and output as a phase shift signal G which is a function of the amplitude of the loop return signal as well as of the difference in phase between the respective transmit and loop return signals. A GEB Control 65 enables the user, prior to the summing, to vary the gain of one of the quadrature signal components, exemplarily X, corresponding to the ground component, while maintaining the gain of the other component at unity. These three phase signals, X, Y and G, are then passed through Filters and Gain Stages 70 and supplied to a Threshold Detector 80 which also includes Discriminater Circuits for responding to and generating as an output to the Speaker 40 an audio indication of the presence of target objects in the field of the search loop. Knob switch/setting controls 90 and 91 are provided to enable the operator to vary, respectively, the degree of sensitivity of the instrument and the degree of discrimination as between target objects of different response characteristics.

The foregoing description is of a conventional metal detector system circuitry in which GEB is effected by the user's manual twiddling and adjustment of the GEB Control setting 65 in the manner described earlier.

FIGS. 2A and 2B depict the same simplified metal detector system with the addition of the AGEB feature. (In this diagram elements labeled with the same reference numerals are substantially the same as the similarly-labeled elements in FIG. 1.) In providing AGEB, offsets in the loop circuit present in the X, or ground component, of the loop return signal, as derived by the Quadrature Phase Detectors 50, are cancelled out by the X Offset Cancel 100 in response to an appropriate actuating signal 102 from the Control Logic Module 110 when the user selects the "Air" position at 115. (Offsets refer to the residual DC levels in the output of the Phase Detectors.) The offset to the X component signal is maintained by the Sample/Hold portion of this element 100 until a subsequent time (to be described later) when a disable signal is supplied thereto from the Control Logic module via Discharge Control line 104. The Summing Amplifier 60 determines the phase G of the loop return signal relative to the transmit signal by inversion summing of a fixed multiple of the Y component with a variable multiple of the X component. The adjustment $\alpha$ applied to the X component at the Summing Amplifier is accomplished through the use of a Chopper 120 whose duty cycle, between zero and 100%, is determined by the DC Control Voltage level 131 applied to Converter 130. The square wave signal 132 determines the frequency of the Converter's output. In other words, the duration of the duty cycle, corresponding to the adjustment $\alpha$, is responsive to the output 131 of the GEB Sample/Hold 170.

In the air balance mode of operation the Error Amplifier 150, through a feedback loop which is enabled by a control pulse 162 from the Control Logic module, forces the output 164 of the Air Sample/Hold 160 to match the level of the G signal supplied from the Summing Amplifier 60. A beep indication, signifying completion of the air balance step, is provided by the Audio Drive 30 upon the enabling of the feedback loop in response to a pulse on the reset line 35 provided by the Control Logic module. Output 164 is held until the ground balance step (described later) is completed. The Error Signal output 152 is provided as an input to GEB Sample/Hold 170 whose function is to provide the Control Voltage level 131.

In the ground balance mode the Error Amplifier, through an AGEB Feedback Path which is enabled by control signals 171, 172 from the Control Logic module, forces the output of the GEB Sample/Hold to match the G signal supplied from the Summing Amplifier 60 to the output 164 of the Air Sample/Hold. With this matching accomplished, the G signal in ground balance mode has been automatically modified, through adjustment of the X component signal, to equal the G signal level in air balance mode of the detector system. This corresponds to the static balance operation described earlier. When this step is completed the GEB Sample/Hold 170 is caused to hold its output level 131 by the control signals 171, 172; at the same time the X Offset Cancel 100 is disabled by the control signal 104. An audio beep indication, signaling that this has occurred, is provided by the Audio Drive 30 in response to a pulse on the reset line 35 provided by the Control Logic module.

If it is desired that the system perform a dynamic ground exclusion balance as earlier described, then the user selects the "Gnd" position at 115, otherwise this feature is disabled. In the dynamic GEB setting a Slope Detector 180, responsive to the derivative of the X component signal, provides a Ground Signal 182 whose polarity is indicative of the direction of the X component's slope. For example, a first polarity signifies the Search Loop 20 approaching the ground, and the other polarity, moving away or no movement relative to ground. A change in that signal from the first to the second polarity signifies the point at which the search loop is closest to the ground. As the Search Loop moves away from ground or is static, as monitored by the Slope Detector, the Error Amplifier 150 functions as when in the air balance mode to force the Air Sample/Hold output 164 to match the Summing Amplifier output G. When the Search Loop approaches the ground, the output 164 is held (as before), and in response to a control signal from the Control Logic on the Slow Adjust line 172 the AGEB Feedback Path is closed and the DC Control Voltage 131 is adjusted (as described before) in response to the Error Signal 152 produced upon the matching of Summing Amplifier output G to the Air Sample/Hold output 164. In this dynamic GEB mode of operation a slow adjustment rate, exemplarily about ten times the time constant of the fast adjustment rate used in the static balance mode, is utilized to limit the speed of the correction provided by the AGEB Feedback Path. This is preferably done, while in this mode, so as to minimize the error which would otherwise occur due to the presence of offsets in the X component signal. (During dynamic balance, it will be recalled, the X Offset Cancel 100 is disabled.) If the unit were left at a fast adjustment rate, for example a circuit time constant of one second as opposed to ten seconds, the circuit would hunt back and forth around the correct GEB setting.

An exemplary electrical schematic of the circuitry of the system, depicted in block diagram form in FIGS. 2A and 2B, is shown in FIGS. 3A1-3A7 and 3B1-3B3. Sections of the circuitry have been partitioned off by dashed lines and labeled with reference numerals corresponding to those of the corresponding elements in the block diagram of FIG. 2. Component elements in the schematic, and their respective values, are shown using standard industry nomenclature.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In an induction balance transmit/receive type of portable metal detector having an oscillator, a search head with a transmit coil driven by said oscillator to produce a magnetic field and a receive coil producing as an output a loop return signal responsive to changes in said magnetic field caused by the nearby environment, a pair of phase detectors receiving said loop return signal and producing a pair of component signals in quadrature, means for adding said component signals together to produce a phase detection signal, and indicator means responsive to the amplitude of said phase detector signal, the improvement comprising:
    (a) air balance circuit means, responsive to said phase detector signal when said search head is held away and remote from the ground, for automatically adjusting said phase detection signal level so as to cancel out offsets occurring in said loop return signal;
    (b) static ground balance circuit means for screening out on a one-time, user-actuatable basis ground effects, said ground effects being the effects on said loop return signal of the mineralization content of the ground in the vicinity of said metal detector;
    (c) dynamic ground balance circuit means for screening out on a continuing, repetitive basis said ground effects; and
    (d) user-selectable switch means for transferring said metal detector being two modes of operation, the first mode utilizing said air balance circuit means to adjust said phase detection signal to an air balance level of said detector, and the second mode utilizing said static and said dynamic ground balance circuit means to provide a screening out from said phase detection signal of said ground effects.

2. The metal detector of claim 1 including control means for varying the sensitivity of said detector in responding to the mineralization content of the ground in the vicinity of said detector.

3. The metal detector of claim 1 including means for providing an indication when said air balance circuit means has completed said adjustment.

4. The metal detector of claim 1 wherein said dynamic ground balance circuit means has a circuit time constant which is at least an order of magnitude larger than the circuit time constant of said static ground balance circuit means so as to slow the response and thereby avoid hunting in the operation of said dynamic ground balance circuit means.

5. The metal detector of claim 1 wherein a first indication is given when said metal detector has completed an air balance operation and a second indication is given when said metal detector has completed a static ground balance operation.

6. The metal detector of claim 1 characterized in that said dynamic ground balance circuit means includes slope detector means for producing an output signal responsive to both a change in the distance of said search head from the ground and the direction of said change, said output signal being utilized in said dynamic ground balance circuit means for screening out said ground effects.

* * * * *